United States Patent
Nielsen et al.

(10) Patent No.: US 8,186,949 B2
(45) Date of Patent: May 29, 2012

(54) METHOD FOR DAMPING TOWER VIBRATIONS IN A WIND TURBINE INSTALLATION

(75) Inventors: Finn Gunnar Nielsen, Bones (NO); Bjorn Skaare, Bergen (NO); John Olav G. Tande, Trondheim (NO); Ian Norheim, Biri (NO); Kjetil Uhlen, Trondheim (NO)

(73) Assignee: StatoilHydro ASA, Stravanger (NO)

( * ) Notice: Subject to any disclaimer, the term of this patent is extended or adjusted under 35 U.S.C. 154(b) by 1024 days.

(21) Appl. No.: 12/091,957

(22) PCT Filed: Oct. 30, 2006

(86) PCT No.: PCT/NO2006/000385
§ 371 (c)(1),
(2), (4) Date: Jun. 9, 2008

(87) PCT Pub. No.: WO2007/053031
PCT Pub. Date: May 10, 2007

(65) Prior Publication Data
US 2008/0260514 A1    Oct. 23, 2008

(30) Foreign Application Priority Data

Nov. 1, 2005   (NO) .................................... 20055118

(51) Int. Cl.
*F03D 7/04* (2006.01)
*F03D 11/04* (2006.01)

(52) U.S. Cl. .................... 416/9; 416/1; 416/31; 416/32; 416/37; 416/85

(58) Field of Classification Search .................. 416/1, 9, 416/31, 32, 37, 85
See application file for complete search history.

(56) References Cited

U.S. PATENT DOCUMENTS 4,420,692 A * 12/1983 Kos et al. ........................ 290/44

(Continued)

FOREIGN PATENT DOCUMENTS

EP    1719910 A1    11/2006

(Continued)

OTHER PUBLICATIONS

T. G. Van Engelen, et al, Title: "Development of wind turbine control algorithms for industrial use", Jul. 2001, Paragraph 1, 2 and 3.2, Figure 1: European Wind Energy Conference, Copenhagen Denmark.

(Continued)

*Primary Examiner* — Jerome Jackson, Jr.
*Assistant Examiner* — David Spalla
(74) *Attorney, Agent, or Firm* — Sutherland Asbill & Brennan, LLP

(57) ABSTRACT

A method in connection with a wind turbine installation for damping tower vibrations, in particular a floating wind turbine installation comprising a floating cell, a tower arranged over the floating cell, a generator mounted on the tower that is rotatable in relation to the wind direction and fitted with a wind turbine, and an anchor line arrangement connected to anchors or foundations on the sea bed. The tower's eigenvibrations, $\omega_{eig}$, are damped by, in addition to control with the controller in the constant power or RPM range of the wind turbine, an increment, $\Delta\beta$, being added to the blade angle of the turbine blades on the basis of the tower velocities, $\Delta Z$, so that the eigenvibrations are counteracted. The vibrations in $\beta$ that have frequency $\omega_{eig}$ can expediently be damped by means of a stabiliser with the transfer function $H_{stab}(s)$ between the tower velocities, $\Delta Z$, and the blade angle, $\Delta\beta$, which is such that the loop transfer function $H_{\beta-\Delta Z\text{-}dot}(j\omega_{eig})H_{stab}(j\omega_{eig})=-b$, which means that: (I) where "b" is a variable depending on the moment and thrust characteristics of the turbine blades.

16 Claims, 7 Drawing Sheets

U.S. PATENT DOCUMENTS

| | | | |
|---|---|---|---|
| 4,435,647 A | 3/1984 | Harner et al. | |
| 6,525,518 B1 | 2/2003 | Garnaes | |
| 7,347,667 B2 * | 3/2008 | Wobben | 416/1 |
| 7,692,322 B2 * | 4/2010 | Wakasa et al. | 290/44 |
| 2004/0151584 A1 | 8/2004 | Blakemore | |
| 2006/0033338 A1 * | 2/2006 | Wilson | 290/44 |
| 2008/0206051 A1 | 8/2008 | Wakasa et al. | |
| 2010/0111693 A1 * | 5/2010 | Wilson | 416/1 |

FOREIGN PATENT DOCUMENTS

| | | |
|---|---|---|
| GB | 2117933 | 10/1983 |
| JP | 58-17884 | 10/1983 |
| JP | 2001-511497 | 8/2001 |
| JP | 2003-113769 | 4/2003 |
| JP | 2008-522075 | 6/2008 |
| WO | 99/05414 | 2/1999 |
| WO | 03/004869 | 1/2003 |
| WO | 2005/021961 | 3/2005 |
| WO | 2005/083266 | 9/2005 |
| WO | 2005083266 A1 | 9/2005 |
| WO | 2005090781 A1 | 9/2005 |
| WO | 2007-010322 | 1/2007 |

OTHER PUBLICATIONS

E. L. Van Der Hooft, et al, Title: "Design tool for wind turbine control algorithms", Nov. 2004, Figure 2: ECN Wind Energy, Netherlands.

Yoshinori Ueda, et al., Title: "Development of next generation 2MW class large wind turbines", Oct. 2004, Technical Review vol. 41 No. 5, paragraph 3.(4), Figure 7: Mitsubishi Heavy Industries, Ltd.

E.L. Van Der Hooft, et al., Title: "Wind turbine control algorithms", ECN-C-03-111, Dec. 2003, paragraph 5.2.

Technical Sales Document, Appendix 4: "Vestas V82 and V90 Wind Turbine Specifications, and the Vestas V100 Wind Turbine Product Brochure", 2004, Paragraph 1.3.2.1: TSD 4000258-01 EN, pp. 1-38.

* cited by examiner

METHOD FOR DAMPING TOWER VIBRATIONS IN A WIND TURBINE INSTALLATION

TECHNICAL FIELD

The present method concerns a method in connection with a wind turbine installation for damping tower vibrations, in particular a floating wind turbine installation. The wind turbine installation comprises a floating cell, a tower arranged over the floating cell, a generator mounted on the tower that is rotatable in relation to the wind direction and fitted with a wind turbine, and an anchor line arrangement connected to anchors or foundations on the sea bed.

BACKGROUND OF THE INVENTION

The development of floating, anchored wind turbines that can be used at great depths will strongly enhance access to areas for the expansion of wind energy at sea. Current technology for wind turbines located at sea is considerably limited to permanently installed towers at low depths, under approximately 30 m.

Permanent installations at depths over 30 m generally result in technical problems and high costs. This has meant that, until now, sea depths of more than around 30 m have been regarded as technically and commercially unfavourable for the installation of wind turbines.

With floating solutions at greater sea depths, the foundation problem and costs associated with complicated, labour-intensive installations can be avoided.

A wind turbine that is mounted on a floating foundation will move on account of the forces from the wind and waves. A good wind turbine foundation design will ensure that the system's eigenperiods for rigid cell movements (surge, sway, heave, roll, pitch and yaw) are outside the period range for sea waves, which is approximately 5-20 seconds.

There will still be forces that act in connection with the eigenperiods for the system (swell, non-linear wave forces, fluctuations in wind speed, current forces, etc.). If such forces are not to produce unacceptable movements, they must not be too large, and the system must have damping for the relevant periods.

SUMMARY OF THE INVENTION

The present invention represents a solution, more precisely a method, for effective damping of tower vibrations for wind turbine installations. The results produced in simulation tests show that vibrations in connection with the system's eigenperiod were damped by a factor of approximately 10 using the method in accordance with the present invention.

The present invention is characterised by the features as defined in the attached independent claim 1.

Dependent claims 2-8 define advantageous features of the present invention.

These and other features of the present application will become apparent to one of ordinary skill in the art upon review of the following detailed description when taken in conjunction with the drawings and appended claims.

BRIEF DESCRIPTION OF THE DRAWINGS

The present invention will be described in further detail in the following using examples and with reference to the attached drawings, where.

DETAILED DESCRIPTION OF THE INVENTION

Figure 1:
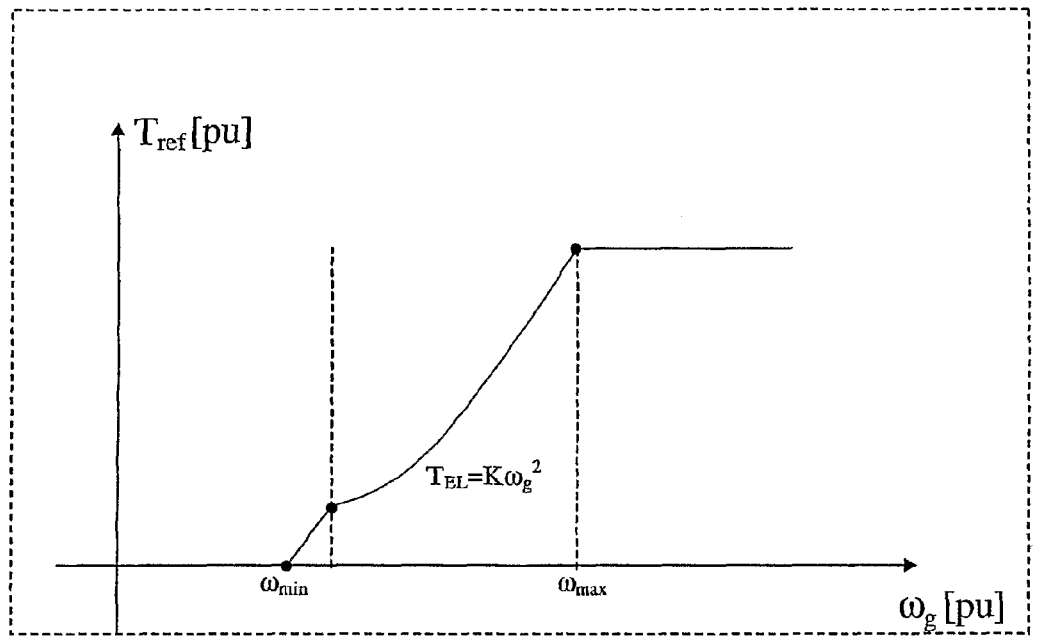
FIG. 1 shows a diagram with various RPM ranges for a wind turbine with RPM and rotor pitch control.

When the wind acts on a wind turbine installation, the forces from the wind will contribute to movements in the foundation. However, the forces from the wind turbine depend on how the turbine is controlled, i.e. how the RPM and the pitch of the turbine blades vary with wind velocity. The control algorithms will vary with the wind velocity. A typical control philosophy for land-based wind turbines is shown in FIG. 1. With reference to this Figure, it can be seen that:

In the startup range, small forces act on the wind turbine. The wind forces will have little effect on the movements. If the movements are affected by the wind forces, it is possible to control the turbine approximately as in the variable RPM range.

In the variable RPM range, there is an approximately constant pitch angle for the turbine blades. The aim is to control the RPM for the turbine so that maximum power can be produced at any time, given the momentary relative wind velocity against the turbine. The relative wind velocity consists of mean wind velocity, variation in wind velocity and the movement (velocity) of the tower. This means that there will be increased power and increased thrust from the turbine when the wind increases. In turn, if the system (the wind turbine, including the foundation) moves against the wind with a combined pitch and surge movement, this entails increased wind velocity for the turbine, and the thrust increases. This is equivalent to a damping force (a force that acts against the velocity). In this wind velocity range, the wind forces on the turbine will therefore contribute positive damping to the system. This will contribute to reduced movements in connection with the system's eigenperiods.

In the constant moment range, the turbine's rated power is reached. It is then usual to maintain approximately constant RPM and control the moment and thus the power by regulating the pitch angle of the turbine blades. The aim is to maintain approximately constant power. If the wind velocity increases, the pitch angle is increased in order to reduce the moment. This also produces reduced thrust despite the increased wind velocity. Unlike that which happens in the variable RPM range, the result is thus a negative damping effect. A standard control system will try to adjust all power variations that are due to changes in the relative wind velocity against the turbine. This is done by changing the blades' pitch angle so that the moment on the turbine is kept constant despite the variation in relative velocity. This will result in the wind turbine contributing negative system damping, which thus increases the tower's movement in connection with the eigenperiods. This can produce unacceptably large movements.

With the present invention, it has been found that the control algorithms must be modified to prevent the negative link between control of the wind turbines and the system's movements.

It is desirable to maintain approximately constant RPM and the moment in the "constant moment" range, but, using appropriate filtering and control algorithms, that will be described in further detail in the following, the turbine is still prevented from supplying negative damping in connection with resonance. In fact, the control philosophy outlined will supply positive damping in connection with resonance and thus reduce the system's movements. The control philosophy in accordance with the present invention will otherwise only result in minor fluctuations in power produced. This is demonstrated by numerical simulations. Moreover, the reduced movements will significantly contribute to reduced load on the wind turbine and the tower structure.

Figure 2:
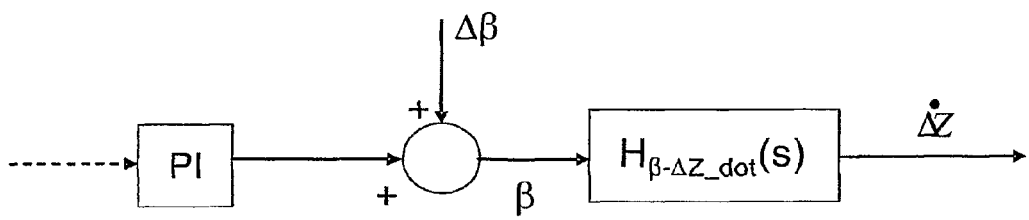
FIG. 2 shows a section of a blade angle controller and a sketch of the transfer function between the blade angle of the wind turbine rotor and the tower velocity.

FIG. 2 shows a section of a blade angle controller, with proportional and integral control (PI), and a sketch of the transfer function.

$H_{\beta\text{-}\Delta Z\_dot}(s)$, between the blade angle, $\beta$, and the horizontal tower velocity. This is the change required in the turbine blade angle to maintain constant power on the turbine when the relative velocity changes.

A vibration in $\beta$ that has a frequency equal to the eigenfrequency $\omega_{eig}$ of the tower vibrations will, via the transfer function $H_{\beta\text{-}\Delta Z\_dot}(s)$, result in the tower's movement $\Delta \dot{Z}$ given by the amplification and phase of $H_{\beta\text{-}\Delta Z\_dot}(s)$ for $\omega_{eig}$.

It is given that:

$$H_{\beta\text{-}\Delta Z\_dot}(j\omega_{eig})=K \cdot e^{j\phi} \quad (1.1)$$

To damp the vibrations in $\beta$ with frequency $\omega_{eig}$, it is possible to design a stabiliser with the transfer function $H_{stab}(s)$ between $\Delta \dot{Z}$ and $\Delta \beta$ that is such that the loop transfer function $H_{\beta\text{-}\Delta Z\_dot}(j\omega_{eig}) \cdot H_{stab}(j\omega_{eig})=-b$. This means that:

$$H_{stab}(j\omega_{eig}) = \frac{-b}{K} e^{-j\varphi} \quad (1.2)$$

where "b" is a variable control amplifier. This is selected on the basis of obtaining best possible damping of the tower ocillations and at the same time avoiding unwanted exitation of other eigenfrequncis depending on the turbine blade momentum and thrust characteristic.

Such a transfer function will ensure that the blade angle is not adjusted for the velocity fluctuations that occur in connection with the tower's eigenfrequency. This will produce frequency-dependent damping. In connection with the tower's eigenfrequency, this damping will be equivalent to the damping produced with a constant pitch system. If the amplification is increased, the damping can be increased further. If it is reduced, the damping will be reduced until we reach a limit at approximately zero damping contribution.

To ensure that the stabiliser does not have an unwanted effect on $\beta$ at frequencies that are considerably different from the eigenfrequency of the tower vibrations, it is important for $H_{stab}(s)$ to have necessary filters that filter these frequencies (see the later section).

Figure 3:
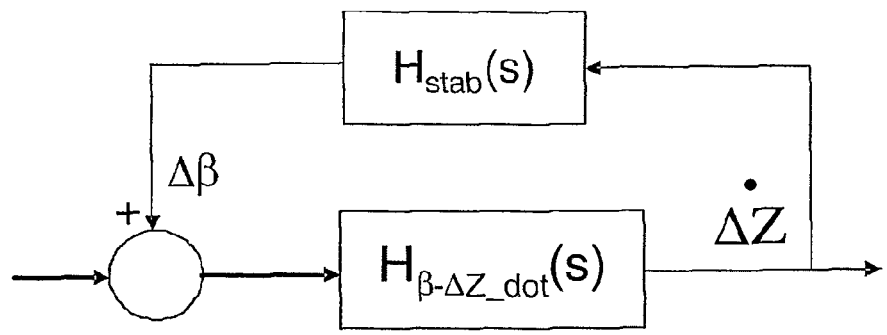
FIG. 3 shows the transfer function between the blade angle and the tower velocity as well as the transfer function for a stabiliser that damps vibrations with the eigenfrequency of the tower vibrations.

FIG. 3 shows an example of the transfer function between the blade angle and the tower velocity as well as the transfer function for a stabiliser that damps vibrations with the eigenfrequency of the tower vibrations.

If we take a closer look at the system shown in FIG. 3 and call the signal that comes in from the left (variation in blade angle) $\beta_0$, we can set up the expression for the tower vibrations $\Delta \dot{Z}$ as $$\Delta \dot{Z} = H_{\beta\text{-}\Delta \dot{Z}}(s)\beta_0 + H_{stab}(s)H_{\beta\text{-}\Delta \dot{Z}}(s)\Delta \dot{Z}, \quad (2.1)$$

For the tower vibrations we then get:

$$\Delta \dot{Z} = \frac{H_{\beta\text{-}\Delta \dot{Z}}(s)}{1 - H_{stab}(s)H_{\beta\text{-}\Delta \dot{Z}}(s)}\beta_0 = H_{ls}(s)\beta_0, \quad (2.2)$$

Here, $H_{ls}(s)$ is the transfer function for the closed loop, including the stabiliser, from $\beta_0$ to $\Delta \dot{Z}$.

Additional damping that damps the tower vibrations at a given frequency $\omega_{eig}$ can be designed by making:

$$H_{stab}(j\omega_{eig})H_{\beta\text{-}\Delta \dot{Z}}(j\omega_{eig})<0$$

$$\angle H_{stab}(j\omega_{eig})H_{\beta\text{-}\Delta \dot{Z}}(j\omega_{ejg})=0$$

$$H_{is}(s)\text{stabil} \quad (2.3)$$

It should be noted that any stabiliser designed according to the criteria in (2.3) that will reduce the tower vibrations will not necessarily supply the system with enough damping to make it stable. Therefore, in addition, it is necessary to demand that the system is stable when selecting the controller parameters for the turbine in question.

Figure 4:
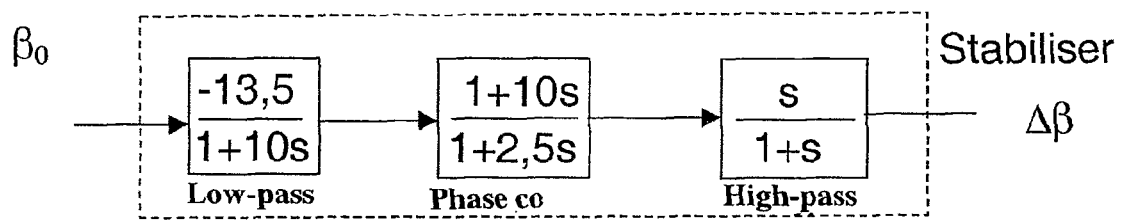
FIG. 4 shows a sketch of the stabiliser that is designed to damp vibrations with the tower's eigenfrequency.

An example was based on the tower vibrations' eigenfrequency, $\omega_{eig}$, being approximately equal to 0.5 radians/second ($f_{eig} \approx 0.0795$ Hz), i.e. on a vibration of the tower having a period of approximately 12.57 s. The stabiliser in accordance with the present invention, which was created to damp the tower vibrations that vibrate with the eigenfrequency, then had a transfer function as shown in FIG. 4.

Figure 5:
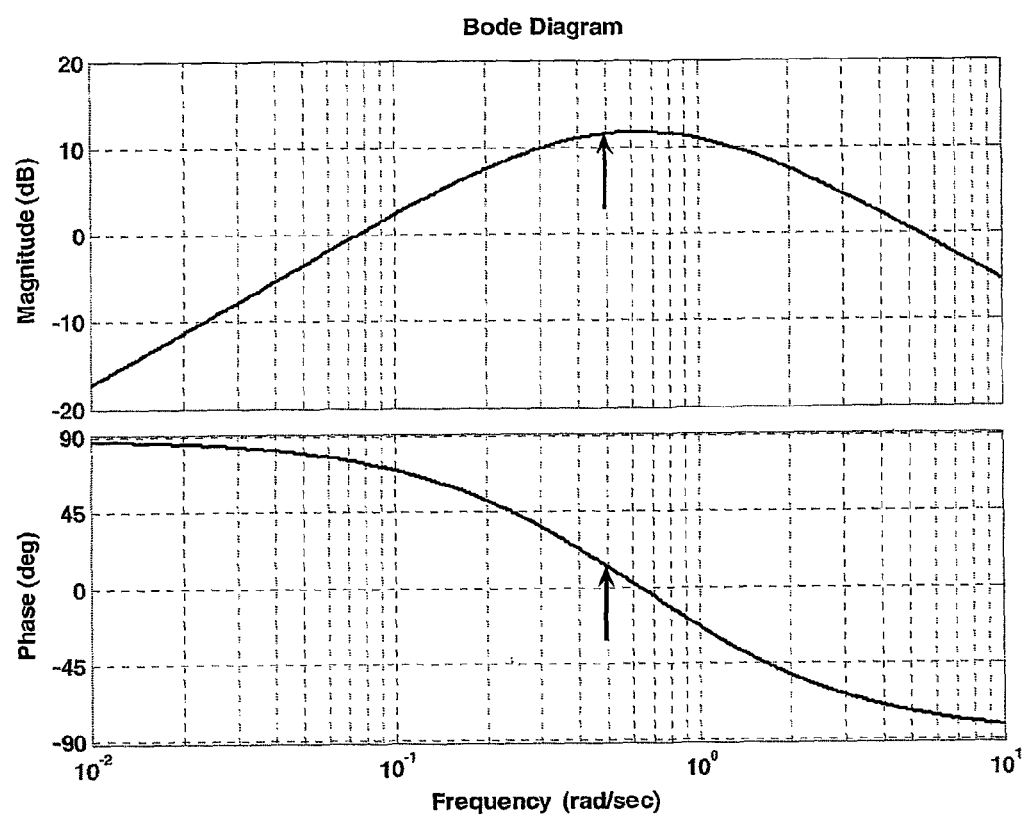
FIG. 5 shows the frequency response (Bode diagram) of the designed stabiliser shown in FIG. 4. The arrows define amplitude and phase in connection with the eigenfrequency of the tower dynamics.

A Bode plot of this transfer function is shown in FIG. 5. The Figure shows the frequency response of the designed stabiliser. The arrows define amplitude and phase in connection with the eigenfrequency of the tower dynamics.

Figure 6:
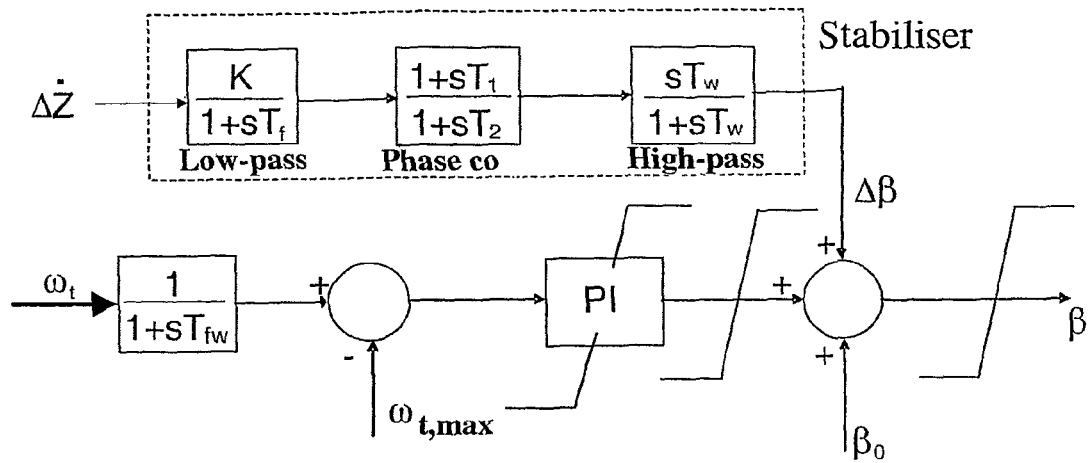
FIG. 6 shows the stabiliser solution included in the control solution in accordance with the present invention.

In the elementary diagram shown in FIG. 6, the stabiliser solution is included in the control solution in accordance with the present invention, and the Figure shows how the output signal from the stabiliser is designed to modulate the turbine's blade angle, $\beta$.

The principle of the solution in accordance with the present invention is thus to damp the tower's eigenvibrations by controlling the blade angle of the turbine blades so that the eigenvibrations are counteracted. The stabiliser is designed so that it only has to affect the blade angle in the frequency range near the tower vibrations' eigenfrequency, $\omega_{eig}$. A high-pass filter ensures that no (zero) amplification is provided at low frequencies, and a low-pass filter ensures that no (zero) amplification is provided at high frequencies. Moreover, a phase-compensating filter must be tuned so that the phase distortion in the stabiliser is such that additional damping, $\Delta \beta$ (+ or −), damps the vibrations in $\Delta\dot{Z}$ that are caused by the tower vibrations' eigenfrequency, $\omega_{eig}$. In other words, this means that the blade angle is affected by an amplitude and phase in relation to the tower's velocity $\Delta\dot{Z}$ in such a way that it damps the vibrations in the tower that have frequency $\omega_{eig}$.

Using the stabiliser leads to the turbine experiencing a relative wind velocity with greatly reduced influence from the tower's eigenvibrations in relation to a situation in which the stabiliser is not used. In addition, the tower will physically vibrate much less when a stabiliser is used.

Simulation Tests.

On the basis of the control solution as described above, simulation tests were carried out for two wind series with a mean wind velocity of 17.43 m/sec. and 20.04 m/sec. These velocities were selected because the need for damping is greatest at such high wind velocities, i.e. when the turbines are operated in constant power mode.

Figure 7:
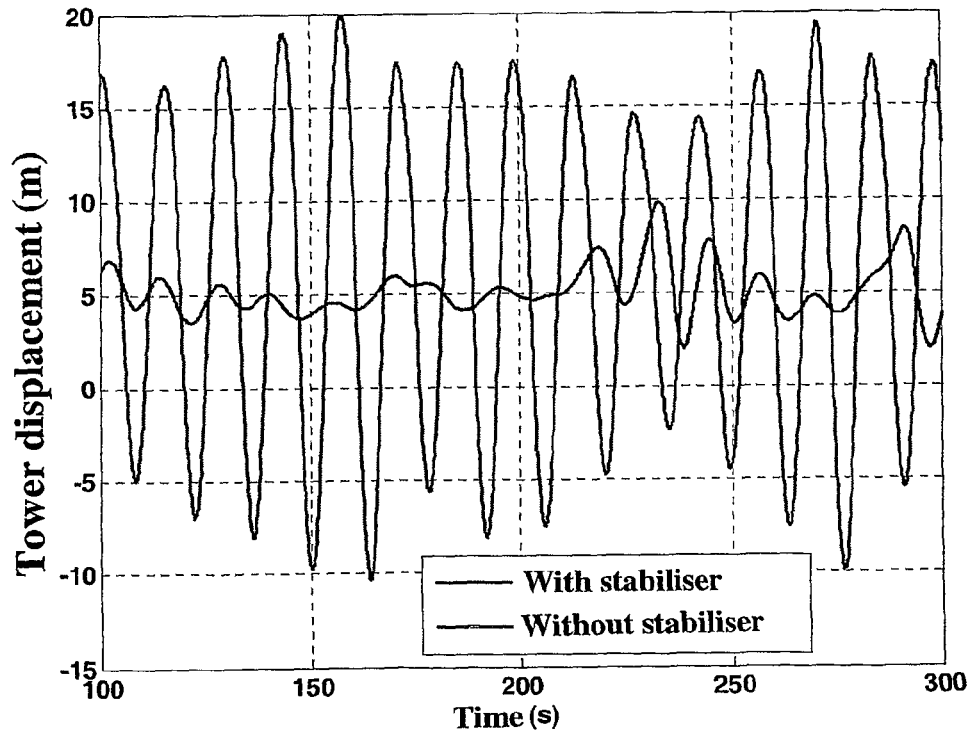
FIG. 7 shows diagrams based on simulation tests, with and without a stabiliser, in connection with, respectively, horizontal displacement of the top of the tower, $\Delta Z$, and active power (pu) supplied to the grid at a mean wind velocity of 17.34 m/sec.
Figure 8:
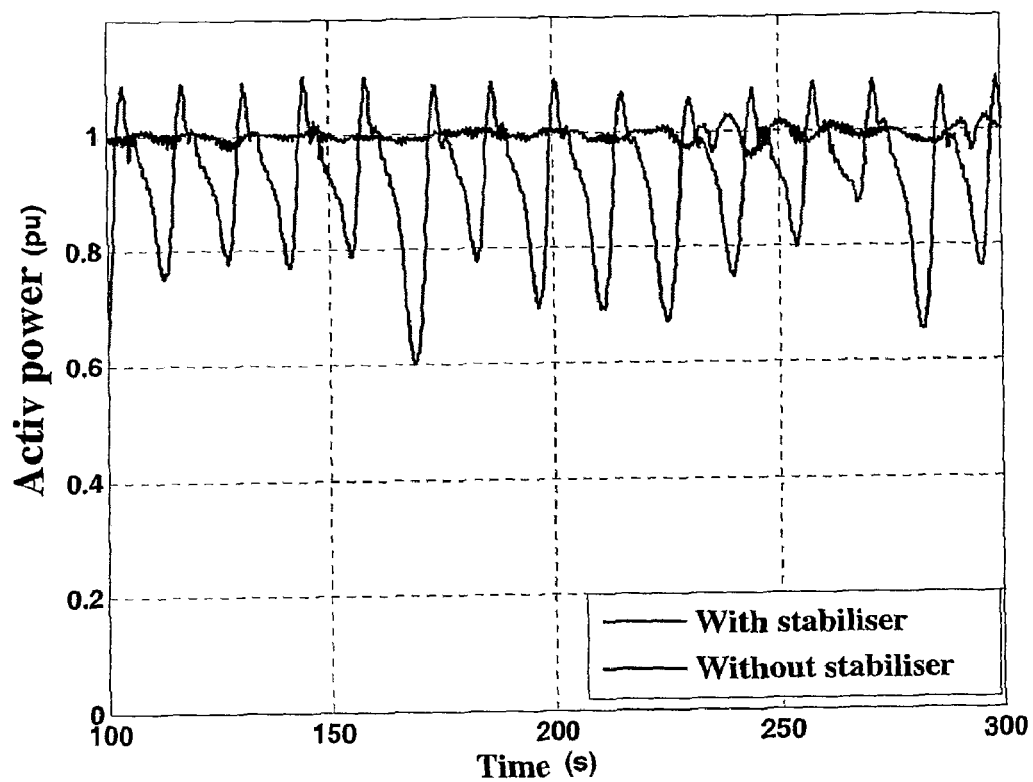
FIGS. 8-10 show diagrams based on simulation tests, with and without a stabiliser, in connection with, respectively, horizontal displacement of the top of the tower, $\Delta Z$, and active power (pu) supplied to the grid at a mean wind velocity of 20.04 m/sec.

FIGS. 7 and 8 show a selection of results from the simulation of wind series at 17.43 m/sec. with and without stabilisers for damping tower vibrations.

FIG. 7 shows that there are considerable tower vibrations when the turbine runs in constant power mode and the stabiliser is not used. This also results in large fluctuations in power supplied to the grid (see FIG. 8). The high amplitudes in the tower vibrations can be explained as follows:

In the constant RPM range, the thrust is reduced when the wind velocity increases. If the tower assumes a rearward velocity, the relative wind velocity that the tower experiences will be reduced. The blade angle (pitch) will be adjusted (increased) to maintain the moment and thus constant power. Thus the thrust will also increase despite the reduced relative wind velocity. Accordingly, when the tower moves at a velocity against the wind direction, the relative wind velocity will increase. The blade angle (pitch) will be adjusted (reduced) to reduce the moment. This will also reduce the thrust. This method of regulating the turbine will thus produce a variation in the thrust that acts in the same direction as the tower movement. I.e. negative damping. This will result in an amplification of the tower movement, in particular near the tower's resonance period in which the movement is controlled by damping. These are the tower vibrations that the stabiliser described above was designed to damp. In the example in question, the vibrations are so large that, even if the turbine runs in constant power mode, it is not able to supply constant power, FIG. 8.

If the stabiliser in accordance with the present invention is used, FIG. 7 shows that the tower vibrations are damped well, and FIG. 8 shows that the power variation is also considerably reduced. The stabiliser thus produces the desired effect. In parts of the simulation, the amplitude of the tower vibrations is reduced from over 10 m without a stabiliser to under 1 m with a stabiliser.

Figure 9:
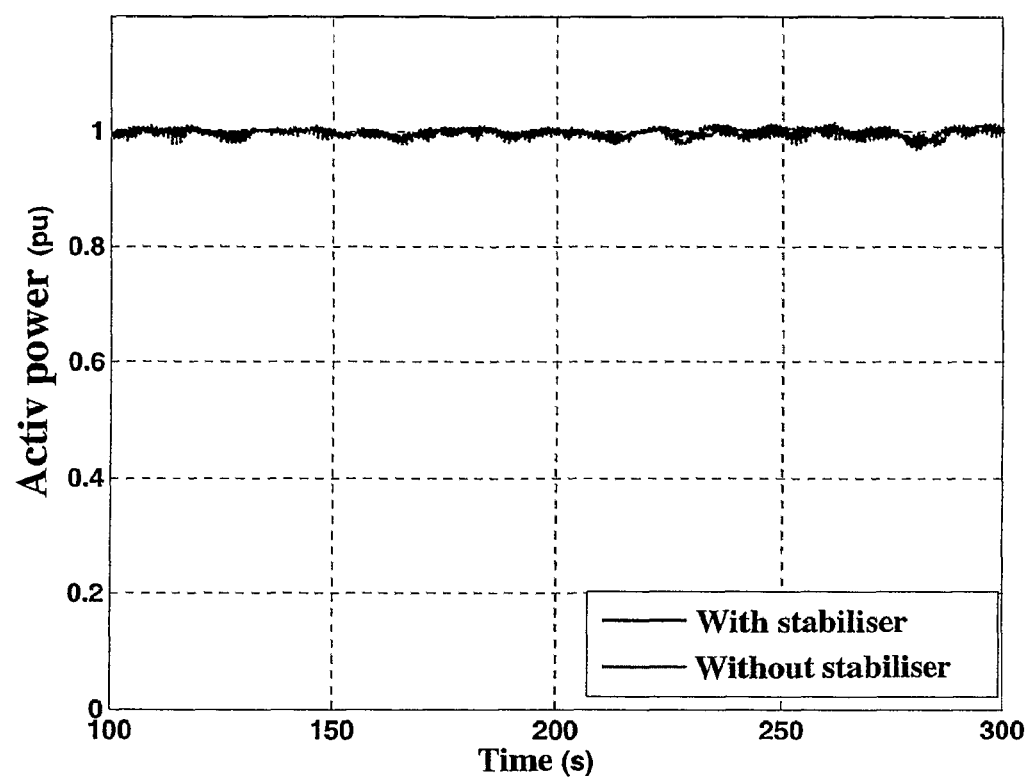
Figure 10:
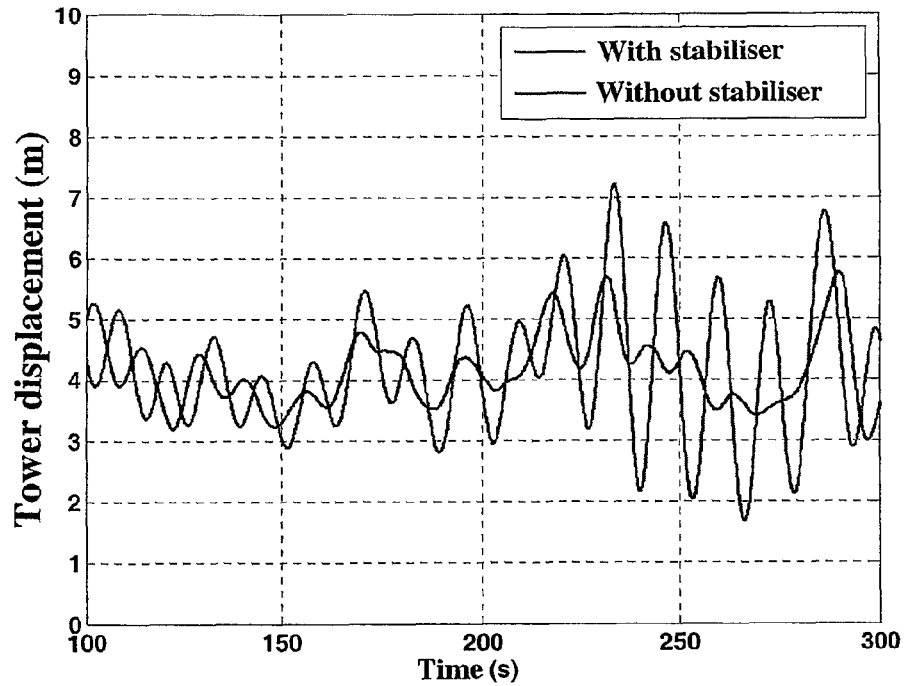

FIG. 9 and FIG. 10 show the results for the case with 20.04 m/sec. wind velocity. It can be seen that the turbine supplies approximately constant power without a stabiliser, FIG. 9, but that the tower vibrations gradually build up to large fluctuations, FIG. 10. If a stabiliser is used, the power remains approximately constant, while a considerable reduction in the tower movement is achieved.

Figure 11:
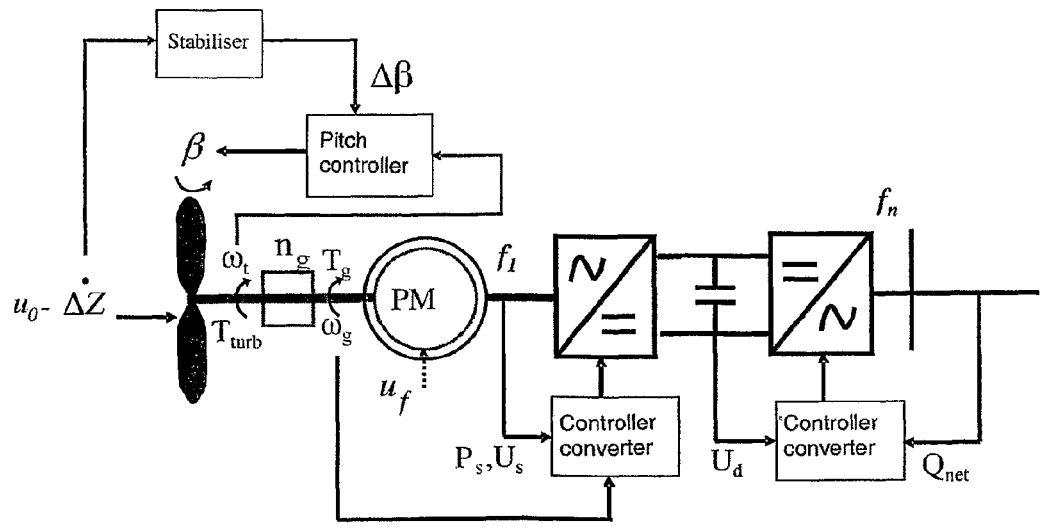
FIG. 11 shows a general diagram of a wind turbine including the stabiliser in accordance with the present invention.

FIG. 11 shows a general diagram of a wind turbine including the stabiliser in accordance with the present invention.

Legend for the figures:
$u_r$—Resulting wind velocity on the turbine
$\beta$—Blade angle
$T_{turb}$—Mechanical moment on the turbine side of the shaft
$T_g$—Mechanical moment on the generator side of the shaft
$\omega_t$—RPM on the turbine side of the shaft
$\omega_g$—RPM on the generator side of the shaft
$n_g$—Yaw conversion (in the present document this is equal to 1)
$u_f$—Permanent magnet generator's internal voltage
$f_1$—Frequency of the permanent magnet generator's terminal voltage
$P_s$—Active power supplied from the permanent magnet generator
$U_s$—Permanent magnet generator's terminal voltage
$U_d$—Voltage in the DC intermediate circuit
$f_n$—Frequency of the mains voltage
$Q_{net}$—Reactive power supplied from the wind turbine to the grid In short, the stabiliser acts by receiving the signal associated with the change in tower velocity, $\Delta\dot{Z}$, from a sensor (not shown) in the form of an accelerometer or similar. The signal is "processed" by the stabiliser, which emits a new signal to a controller for the rotor blades to change the pitch angle, $\Delta\beta$, of the blades to achieve the desired damping of the vibrations in the tower as described above.

The invention, as it is defined in the claims, is not limited to the examples described above. Therefore, the pitch of the turbine blades of the wind turbine may be controlled jointly, i.e. the same pitch angle, $\beta$, for all blades, or individually with a different pitch angle for each blade.

Moreover, although the present invention has been specifically developed for floating wind turbine installations, it may also be used for wind turbine towers in which the flexibility in the tower as such is relatively high, or a combination of a floating wind turbine installation and a flexible tower.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

We claim:

1. A method for damping tower vibrations in a floating wind turbine installation, the installation comprising a floating cell, a tower arranged over the floating cell, a generator mounted on the tower that is rotatable in relation to the wind direction and fitted with a wind turbine comprising turbine blades, and an anchor line arrangement that is connectable to anchors or foundations on a sea bed;
wherein the method comprises:
controlling the generator in response to changes in relative wind velocity against the tower, by controlling the blade angle of the turbine blades by means of a controller in the constant power or RPM range of the wind turbine; and
damping the tower's eigenvibrations, $\omega_{eig}$, by, in addition to controlling the controller in the constant power or RPM range of the wind turbine, an increment, $\Delta\beta$, being added to the blade angle of the turbine blades on the basis of the tower velocities, $\Delta\dot{Z}$, so that the eigenvibrations of the tower are counteracted.

2. A method as claimed in claim 1, wherein the vibrations in the horizontal displacement of the top of the tower $\Delta\dot{Z}$ that have frequency $\omega_{eig}$ are damped by means of a stabiliser with the transfer function $H_{stab}(s)$ between the tower velocities, $\Delta\dot{Z}$, and the blade angle increment, $\Delta\beta$.

3. A method as claimed in claim 2, wherein the transfer function $H_{stab}(s)$ between the tower velocities, $\Delta\dot{Z}$, and the blade angle increment, $\Delta\beta$, is such that the loop transfer function $H_{62\_\Delta Z\_dot}(j\omega_{eig}) \cdot H_{stab}(j\omega_{eig}) = -b$, which means that:

$$H_{stab}(j\omega_{eig}) = \frac{-b}{K}e^{-j\psi}$$

where b is a variable that depends on the moment and thrust characteristics of the blades.

4. A method as claimed claim 2, wherein the transfer function $H_{stab}(s)$ between the tower velocities, $\Delta\dot{Z}$, and the blade angle increment, $\Delta\beta$, is such that the loop transfer function $H_{\beta-\Delta Z\_dot}(j\omega_{eig}) \cdot H_{stab}(s)(j\omega_{eig}) = -1$, which means that:

$$H_{stab}(j\omega_{eig}) = \frac{-1}{K}e^{-j\psi}$$

5. A method as claimed in claim 2, wherein the stabiliser is provided with a high-pass filter that ensures that no amplification is provided at low frequencies.

6. A method as claimed in claim 2, wherein the stabiliser is provided with a low-pass filter that ensures that no amplification is provided at high frequencies.

7. A method as claimed in claim 2, wherein the stabiliser is provided with a phase-compensating filter that is tuned so that the phase distortion in the stabiliser is such that the blade angle increment $\Delta\beta$ damps the vibrations in the horizontal displacement of the top of the tower $\Delta\dot{Z}$ that are caused by the tower vibrations' eigenfrequency, $\omega_{eig}$.

8. A method as claimed in claim 1, wherein the pitch, $\beta$, of each of the turbine blades is controlled individually.

9. A blade angle controller for controlling the blade angle of turbine blades on a floating wind turbine installation, the installation comprising a floating cell, a tower arranged over the floating cell, a generator mounted on the tower that is rotatable in relation to the wind direction and fitted with a wind turbine comprising turbine blades, and an anchor line arrangement that is connectable to anchors or foundations on a sea bed;
wherein the blade angle controller is adapted to control the generator in response to changes in relative wind velocity against the tower, by controlling the blade angle of the turbine blades in the constant power or RPM range of the wind turbine; and
to damp the tower's eigenvibrations, $\omega_{eig}$, by, in addition to controlling the controller in the constant power or RPM range of the wind turbine, an increment, $\Delta\beta$, being added to the blade angle of the turbine blades on the basis of the tower velocities, $\Delta\dot{Z}$, so that the eigenvibrations of the tower are counteracted.

10. A blade angle controller as claimed in claim 9, wherein the vibrations in the horizontal displacement of the top of the tower $\Delta Z$ that have frequency $\omega_{eig}$ are damped by means of a stabiliser with the transfer function $H_{stab}(s)$ between the tower velocities, $\Delta\dot{Z}$, and the blade angle increment, $\Delta\beta$.

11. A blade angle controller as claimed in claim 10, wherein the transfer function $H_{stab}(s)$ between the tower velocities, $\Delta\dot{Z}$, and the blade angle increment, $\Delta\beta$, is such that the loop transfer function $H_{\beta-\Delta\dot{z}}(J\omega_{eig}) \cdot H_{stab}(j\omega_{eig}) = -b$, which means that:

$$H_{stab}(j\omega_{eig}) = \frac{-b}{K}e^{-j\varphi},$$

where b is a variable that depends on the moment and thrust characteristics of the blades.

12. A blade angle controller as claimed in claim 10, wherein the transfer function $H_{stab}(s)$ between the tower velocities, $\Delta\dot{Z}$, and the blade angle increment, $\Delta\beta$, is such that the loop transfer function $H_{62\ -\Delta\dot{z}}(j\omega_{eig}) \cdot H_{stab}(j\omega_{eig}) = -1$, which means that:

$$H_{stab}(j\omega_{eig}) = \frac{-1}{K}e^{-j\varphi}.$$

13. A blade angle controller as claimed in claim 10, wherein the stabiliser is provided with a high-pass filter that ensures that no amplification is provided at low frequencies.

14. A blade angle controller as claimed in any of claims 10, wherein the stabiliser is provided with a low-pass filter that ensures that no amplification is provided at high frequencies.

15. A blade angle controller as claimed in claim 10, wherein the stabiliser is provided with a phase-compensating filter that is tuned so that the phase distortion in the stabiliser is such that $\Delta\beta$ damps the vibrations in the horizontal displacement of the top of the tower $\Delta Z$ that are caused by the tower vibrations' eigenfrequency, $\omega_{eig}$.

16. A blade angle controller as claimed in claim 9, wherein the pitch, $\beta$, of each of the turbine blades is controlled individually.

* * * * *